Jan. 3, 1928.

S. W. NICHOLSON 1,654,747

WINDOW CONTROL MECHANISM

Filed Jan. 16, 1922

Inventor
Stanley W. Nicholson

By Whitemore, Hulbert, Whittemore and Belknap
Attorneys

Jan. 3, 1928.
S. W. NICHOLSON
1,654,747
WINDOW CONTROL MECHANISM
Filed Jan. 16, 1922
2 Sheets-Sheet 2
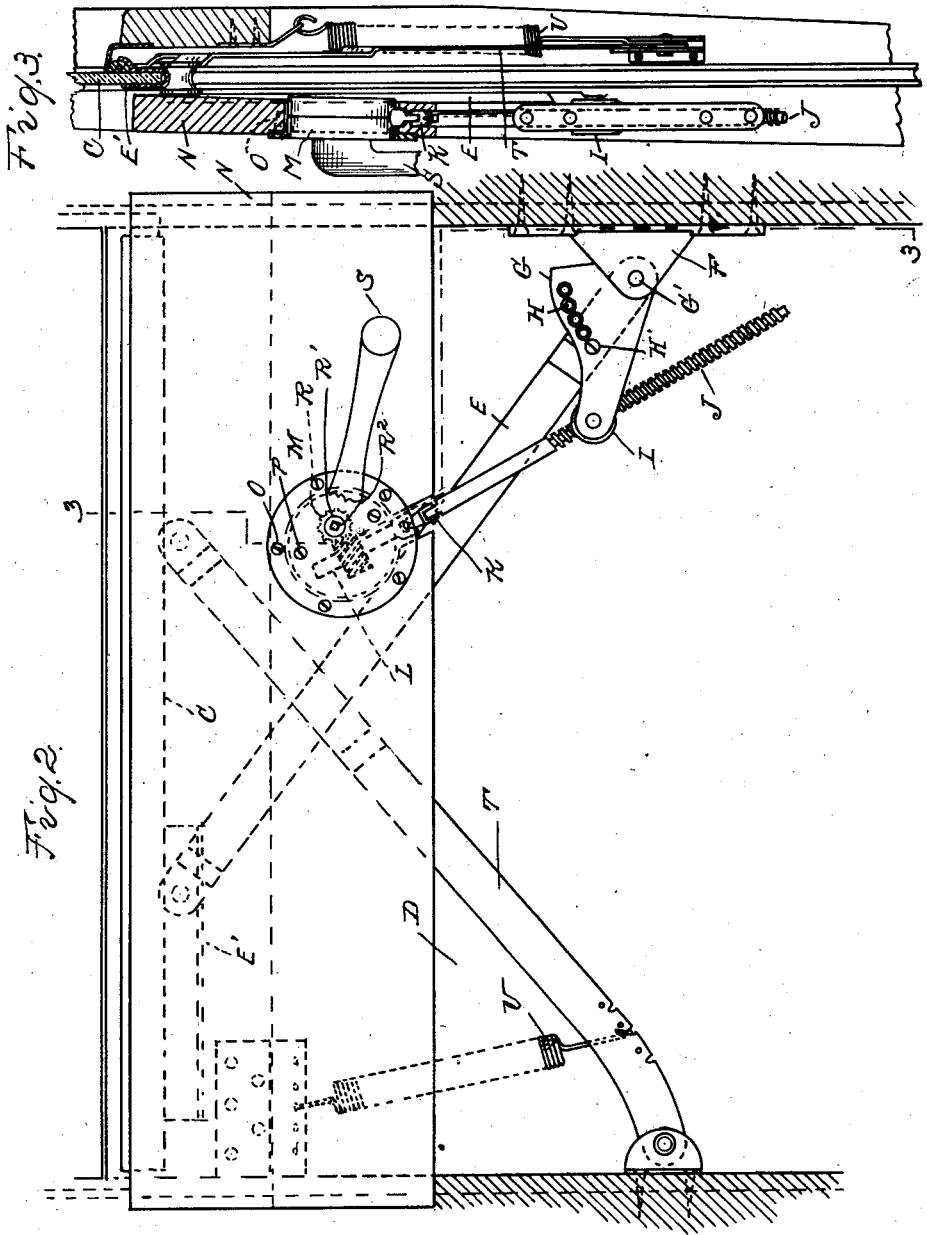
Inventor
Stanley W. Nicholson
By Whittemore, Hulbert, Whittemore, and Belknap
Attorneys Patented Jan. 3, 1928.

1,654,747

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

WINDOW-CONTROL MECHANISM.

Application filed January 16, 1922. Serial No. 529,485.

This invention relates to window control mechanism and more particularly to devices for controlling the vertically sliding window members of automobiles and other vehicles. Said invention is in the nature of an improvement upon applicant's co-pending application Serial Number 416,245 and consists in the structural features hereinafter fully described and illustrated in the accompanying drawings:—

Figure 2 is an enlarged view of the control mechanism as shown in Figure 1;

Figure 3 is a vertical sectional view of the same taken on line 3—3 of Figure 2.

Figure 1:
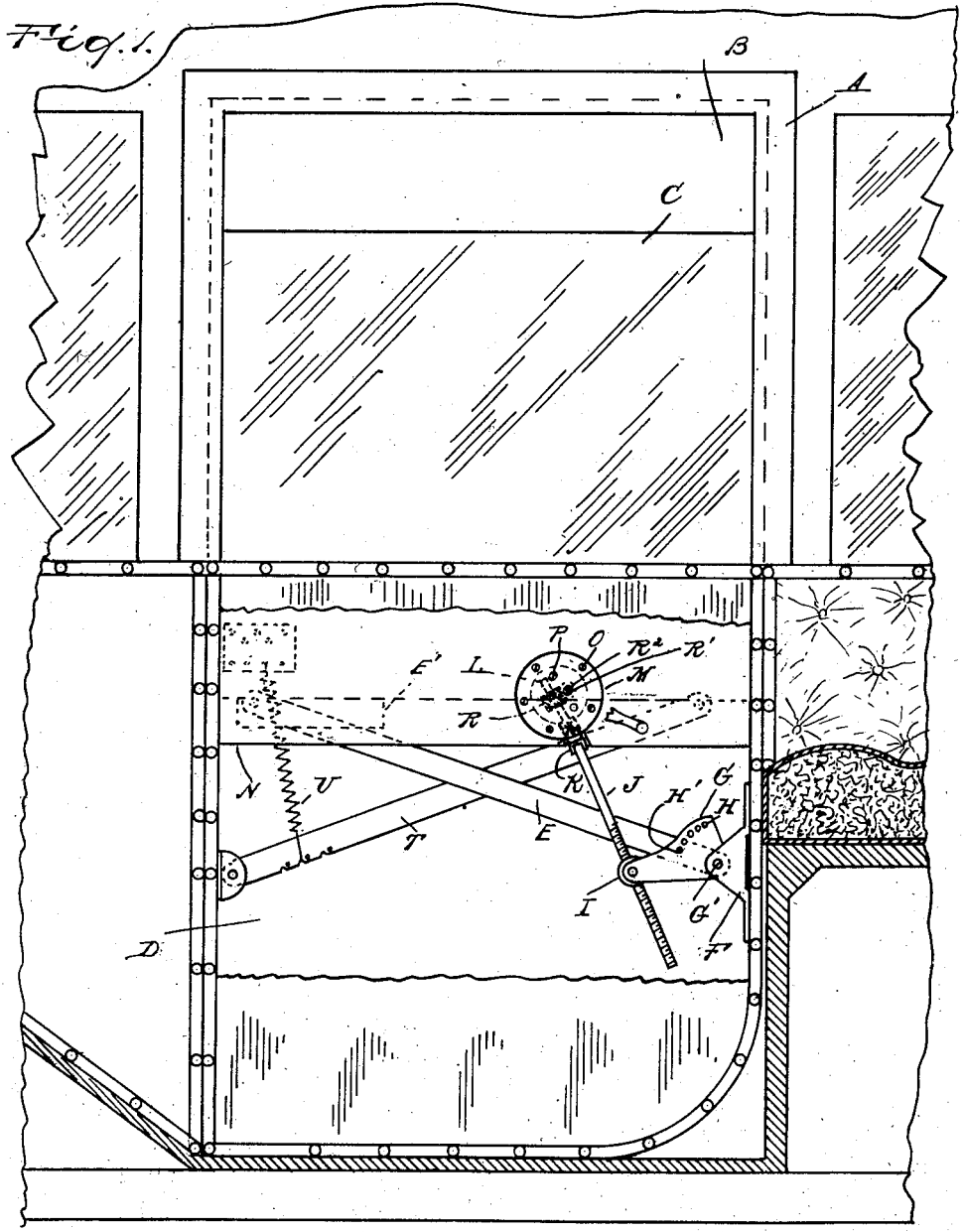
Figure 1 is an interior view of an automobile door having a window equipped with the improved control mechanism.

In these views the reference character A designates an automobile door having in its upper portion the window opening B and provided with a closure for said opening having the nature of a vertically slidable glass plate C, adapted in lowered position to enter a chamber D formed in the lower portion of said door. E is a swinging control arm for raising and lowering the plate C, said arm engaging at one end a channel shaped bracket E' depending from said plate and being pivotally mounted at its other extremity upon a bracket F secured within the chamber D to one of the uprights of the door. G is a sheet metal plate mounted upon the pivot pin G' of the arm E and formed with an arcuate series of apertures H selectively engageable by a pin H' for rigidly connecting said plate to the arm E. Upon the plate G there is swivelly mounted a nut I which is engaged by a screw threaded stem J extending upwardly and connected by a universal joint K to a shaft L journaled in a two part gear case M. Said gear case is secured to the lock board N of the door by screws O and the two parts of said case are rigidly connected by screws P. Q designates a pair of spiral gears mounted within the member M and establishing a drive connection to the shaft L from a relatively transverse stub shaft R having a squared end R' for engagement by a control handle S. Suitable means may be provided for counterbalancing the plate C as for example the pivotal arm T upwardly urged by a coil spring U and engaging at its free end beneath said plate.

In the operation of the described mechanism when the handle S is turned, the gears I drive the shaft L from said handle and the threaded stem J is rotatively driven from said shaft through the universal joint K. The nut I, being restrained from rotation in unison with said stem, is fed longitudinally of the stem through such rotation rocking the plate G and the arm E to which said plate is rigidly secured. Rocking of the arm E raises or lowers the plate C owing to engagement of said arm with the bracket E'. Since the nut I while engaging the stem J is required to swing about the pivot pin J', the stem J must be free to undergo a slight swinging movement, as well as, a rotative one. Provision for such movement is made by connection of said stem to its drive shaft S through the universal joint K. The construction is one that permits the gear box M to be rigidly secured to the lock bolt N and it is to be furthermore noted that the location of the said gear case upon the lock board may be widely varied without affecting the satisfactory operation of the mechanism. This adaptability of the mechanism to be operable from various points upon the door is desirable in adapting the mechanism for use in cars of different makes.

Adjustability of the plate G relative to the arm E is desirable to establish the proper limits of travel for the nut I upon the threaded portion of the stem J.

It will be apparent that the engagement of the stem J with the nut I provides an automatic lock such as will maintain the desired position of adjustment of the plate C.

The universal joint K, as utilized in the described construction, accomplishes the dual function of permitting the stem J to swing in a plane parallel to the plate C to accommodate the arcuate travel of the nut I, and eliminating necessity for any accurate registration of the plane of travel of said nut with the vertical plane determined by the shaft L. In other words the employment of said universal joint permits the stem J to swing freely in any direction, so that any risk of binding due to lack of alignment of the bearings engaged by the shaft L and that formed by the nut I embracing the stem J is avoided.

What I claim as my invention is:—

1. In a window control mechanism, the combination with a sliding window member, of a pivotal control arm therefor, an actuating member for said arm and a member connected to said arm and adjustable relative to said arm about the pivot of the latter for engagement by said actuating member.

2. In a window control mechanism, the combination with a sliding window member, of a pivotal control arm therefor, a rotative threaded swinging stem for actuating said arm, a swivelled nut engaged by said stem for actuating the arm from the stem, and a member carrying said nut adjustably secured to the arm.

3. In a window control mechanism, the combination with a sliding window member, of a pivotal control arm for said member, an actuating element for said arm and a plate engaged by said actuating element copivotal with said arm and angularly adjustable relative to the arm about their common pivot.

4. In a window control mechanism, the combination with a sliding window member, of a pivotal control arm therefor, an actuating member for said arm, and a member connected to said arm adjustable transversely of the arm for engagement by said actuating member.

5. In a window control mechanism, the combination with a sliding window member, of mechanism for actuating said member, and supporting means for said mechanism, said mechanism including relatively adjustable members for moving said member to a predetermined closed position under various positions of said supporting means.

6. In a window control mechanism, the combination with a frame, a sliding window member, and sealing members upon said frame and window member cooperating in a predetermined position of adjustment of of said window member, of mechanism for actuating said window member, and supporting means upon said frame for said mechanism, said mechanism including relatively adjustable members for moving said window member to said predetermined position under various positions of said supporting means.

In testimony whereof I affix my signature.

STANLEY W. NICHOLSON.